United States Patent
Manczak et al.

(10) Patent No.: US 8,112,620 B2
(45) Date of Patent: Feb. 7, 2012

(54) METHOD AND SYSTEM FOR DISCOVERY OF A ROOT FILE SYSTEM

(75) Inventors: Olaf Manczak, Hayward, CA (US);
Anand S. Gupta, Palo Alto, CA (US);
Christopher A. Vick, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 523 days.

(21) Appl. No.: 12/403,738

(22) Filed: Mar. 13, 2009

(65) Prior Publication Data

US 2010/0235615 A1    Sep. 16, 2010

(51) Int. Cl.
*G06F 9/00* (2006.01)
*G06F 15/177* (2006.01)
(52) U.S. Cl. ......................................................... 713/2
(58) Field of Classification Search ........................ 713/2
See application file for complete search history.

(56) References Cited

U.S. PATENT DOCUMENTS

| | | | |
|---|---|---|---|
| 6,718,364 B2* | 4/2004 | Connelly et al. | 709/203 |
| 6,785,219 B1* | 8/2004 | Sasaki et al. | 369/275.3 |
| 7,613,693 B1* | 11/2009 | Na et al. | 1/1 |
| 2006/0174099 A1* | 8/2006 | Wang | 713/1 |
| 2007/0050675 A1* | 3/2007 | Yu | 714/36 |
| 2007/0198714 A1* | 8/2007 | Faden | 709/225 |
| 2008/0133598 A1* | 6/2008 | Williams et al. | 707/104.1 |
| 2008/0134169 A1* | 6/2008 | Williams et al. | 717/175 |
| 2008/0155542 A1* | 6/2008 | Maigne et al. | 718/100 |

* cited by examiner

*Primary Examiner* — Mohammed Rehman
(74) *Attorney, Agent, or Firm* — Osha • Liang LLP

(57) ABSTRACT

A method for discovery of a root file system that includes obtaining a tag corresponding to a boot image for an operating system, identifying, by a boot loader, a location of the boot image having a predefined value matching the tag, loading a kernel of the operating system retrieved from the boot image, and transferring execution to the kernel, wherein the boot loader provides the tag for the location to the kernel. The method further includes identifying, by the kernel, the location of the root file system based on the tag provided by the boot loader, and executing the operating system on a processor using the root file system identified by the kernel.

20 Claims, 6 Drawing Sheets

METHOD AND SYSTEM FOR DISCOVERY OF A ROOT FILE SYSTEM

BACKGROUND

A typical computer system includes hardware and software. The hardware includes functionality to execute the instructions defined in the software. The combination of the hardware and the software allows the user to perform various tasks, such as play games, perform word processing applications, perform geological modeling of a region, and/or perform other such tasks.

One type of software is an application. The application provides the user with the ability to perform such tasks as play games, browse the internet, and perform other such tasks. Applications execute in an execution environment of an operating system. Specifically, the operating system is a type of software that provides an interface between hardware and applications, enforces the sharing of the computer system hardware and software resources, and coordinates the performance of various tasks. Thus, the operating system is a type of software that manages the execution of the computer system.

Execution of the operating system is initiated during a boot process. The following is the typical process to perform to initiate the execution of the operating system. When power is provided to a computer system, firmware on the computer system starts executing. Firmware is a program that is stored in a fixed location of read only memory (ROM). Because of the fixed location, the processor of the computer system is able to obtain instructions from the fixed location of the firmware when power is provided to the processor. When executed, the firmware starts execution of a program called a boot loader. The boot loader is a small program designed to find and initiate execution of the operating system.

In order to initiate the execution of the operating system, the boot loader searches for a boot image containing the operating system. Specifically, the boot image includes a root file system with the files of the operating system. When the boot loader finds the boot image, the boot loader loads and transfers control to the kernel of the operating system. The boot loader includes predefined instructions defining how to start a load routine of the kernel of the operating system.

For the purposes of abstraction, when control is transferred to the kernel, the kernel is unaware that any other program executes on the computer system. In particular, the kernel assumes that the kernel is the only program on the computer system and thereby ignores the existence of the boot loader. Because the kernel assumes that the kernel is the only program executing on the computer system, the kernel searches for the root file system to obtain the remaining operating system files.

The process by which the kernel searches for the root file system is operating system dependent. Specifically, the type of operating system defines how the kernel of the operating system searches for the root file system. When the kernel finds the root file system, the kernel mounts the root file system, thereby making the root file system accessible. At this stage, execution of the full features of the operating system begins.

SUMMARY

In general, in one aspect, the invention relates to a method for discovery of a root file system that includes obtaining a tag corresponding to a boot image for an operating system, identifying, by a boot loader, a location of the boot image having a predefined value matching the tag, loading a kernel of the operating system retrieved from the boot image, and transferring execution to the kernel, wherein the boot loader provides the tag for the location to the kernel. The method further includes identifying, by the kernel, the location of the root file system based on the tag provided by the boot loader, and executing the operating system on a processor using the root file system identified by the kernel.

In general, in one aspect, the invention relates to a computer system for discovery of a root file system that includes a processor and a boot loader executing on the processor. The boot loader is configured to obtain a tag corresponding to a boot image for an operating system, identify a location of the boot image having a predefined value matching the tag, load a kernel of the operating system retrieved from the boot image, and transfer execution to the kernel, wherein the boot loader provides the tag to the kernel. The computer system further includes the kernel executing on the processor. The kernel is configured to identify the location of the root file system based on the tag provided by the boot loader, wherein the operating system is executed on the processor using the root file system identified by the kernel.

In general, in one aspect, the invention relates to a distributed computer system comprising a plurality of nodes. Each of the plurality of nodes is configured to obtain a tag corresponding to a boot image for an operating system, identify, by a boot loader executing on each node of the plurality of nodes, a location of the boot image having a predefined value matching the tag, load a kernel of the operating system retrieved from the boot image on each node of the plurality of nodes, and transfer execution to the kernel on each node of the plurality of nodes, wherein the boot loader provides the tag to the kernel. Each of the plurality of nodes is further configure to identify, by the kernel on each node of the plurality of nodes, the location of the root file system based on the tag provided by the boot loader, and execute the operating system on a processor on each node of the plurality of nodes using the root file system identified by the kernel.

In general, in one aspect, the invention relates to a method for discovery of a root file system of a hypervisor that includes obtaining a first tag corresponding to a boot image for the hypervisor, identifying, by a boot loader, a first location of the boot image for the hypervisor having a predefined value matching the first tag, loading a load routine for the hypervisor retrieved from the boot image for the hypervisor, transferring execution to the load routine, wherein the boot loader provides the first tag to the load routine. The method further includes identifying, by the load routine, the first location of the root file system of the hypervisor based on the first tag provided by the boot loader, and executing the hypervisor on a processor using the root file system of the hypervisor identified by the hypervisor.

Other aspects of the invention will be apparent from the following description and the appended claims.

DETAILED DESCRIPTION

Figure 1:
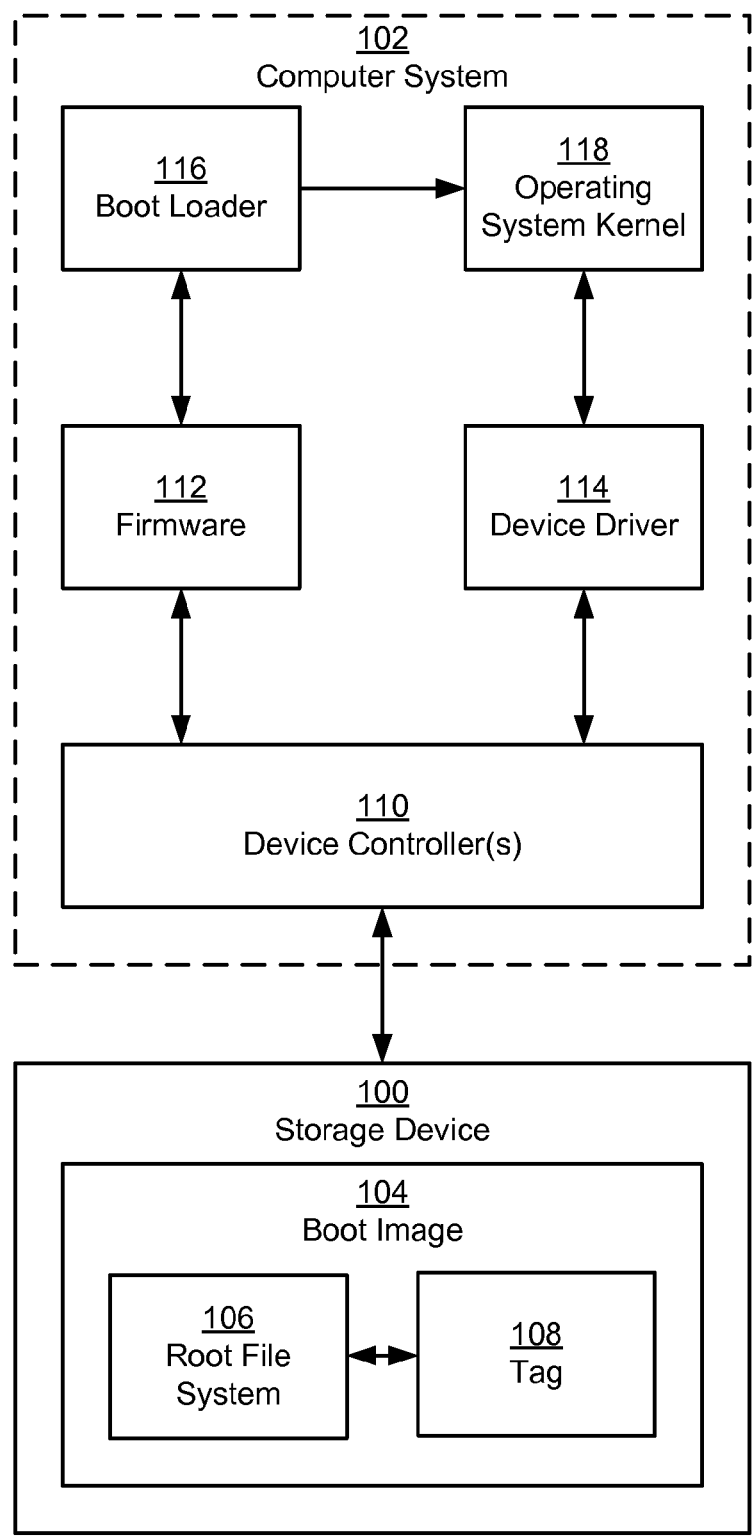
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for unifying the process by which the boot loader identifies the boot image and the operating system kernel identifies the root file system. Specifically, embodiments of the invention use a tag (described below). The tag is associated with the root file system and the boot image. After obtaining the tag, the boot loader identifies the location of the boot image by the boot image having a predefined value matching the tag. When loading and transferring execution to the operating system kernel, the boot loader provides the tag to the operating system kernel. The operating system kernel uses the tag to identify the location of the root file system and mount the root file system from the location. Thus, both the operating system kernel and the boot loader identify the same location.

FIG. 1 shows a schematic diagram of a system in accordance with one or more embodiments of the invention. As shown in FIG. 1, the system includes a storage device (100) and a computer system (102) in accordance with one or more embodiments of the invention. Each of these components is described below.

In one or more embodiments of the invention, a storage device (100) is a hardware device on which the operating system is located. For example, the storage device (100) may be a hard drive, flash memory, a floppy disk, a compact disk, a networked storage server, or any other type of hardware that is used for storage. Further, the storage device (100) may be partitioned. In such a scenario, multiple operating systems may exist on a single storage device (100), each in a separate partition. Additionally, the storage device (100) may be internal or external to the computer system (102). Although FIG. 1 shows a single storage device (100), the computer system (102) may be connected to multiple storage devices. The multiple storage devices may be of heterogeneous types. For example, one storage device may be flash memory while another storage device is a hard disk.

The storage device (100) includes a boot image (104). A boot image (104) is a representation of the operating system as viewed by the boot loader (116). The boot image (104) includes a root file system (106) and a tag (108) in accordance with one or more embodiments of the invention.

In one or more embodiments of the invention, the root file system (106) is the initial file system on which other file systems may be mounted. A file system is an organization mechanism for the storage and retrieval of files. The root file system (106) stores the files for the operating system. As part of the files for the operating system, the root file system (106) contains the files for the operating system kernel (118), such as the files defining a load routine (not shown). A load routine is an operating system routine called by the boot loader (116) to perform the initial tasks of finding the root file system (106) and load the operating system.

The root file system (106) is associated with a tag (108) in accordance with one or more embodiments of the invention. The tag (108) is a unique identifier for a file system on a storage device or storage device partition in an execution environment. Moreover, the tag (108) is unique for each different version of the operating system. Because the tag (108) is a unique identifier of the operating system, the tag (108) provides a unique identifier for the boot image (104) and the root file system (106). In one or more embodiments of the invention, the tag (108) is at least unique amongst all tags accessible by the boot loader (116) and operating system kernel (118).

In one or more embodiments of the invention, the tag (108) has a predefined value. In one or more embodiments of the invention, the predefined value is an identifier that uniquely identifies the operating system. For example, the predefined value may be an alphanumeric identifier, a hexadecimal number, or other type of identifier. In one or more embodiments of the invention, the predefined value is different for different instances of the same version of the same operating system. Alternatively, two operating systems that are replicas of each other and exist on different storage devices may be associated with the same predefined value. In one or more embodiments of the invention, the predefined value is defined prior to providing power to the computer system (102) when the tag (108) is used. For example, the predefined value may be defined as part of configuring of the storage device (100), configuring the system, or storing the operating system on the storage device.

The predefined value may be stored in various locations associated with the root file system (106) in the storage device (100). For example, the predefined value may be stored in the meta-data of the root file system (106), in the label of the root file system (106), in a file of the root file system (106), or as a name of a file on the root file system (106). Other locations may be possible without departing from the scope of the invention. In the example in which the predefined value is a file of the root file system (106), the file containing the tag (108) may have a name that is common across all root file systems accessible by the computer system (102) that is used to identify the file. For example, each root file system may have a file labeled, "TagFile" that contains the predefined value of the tag.

Continuing with FIG. 1, the storage device (100) is connected to the computer system (102). Specifically, the computer system (102) includes functionality to retrieve data from the storage device (100). The computer system (102) may be any type of computing device known in the art. For example, the computer system (102) may be a server, a personal computer, a workstation computer, or any other computer system. Further, the starting of the computer system (102) may be instigated remotely or while in the physical vicinity of the computer system (102). In one or more embodiments of the invention, the computer system (102) may be part of a cluster of computer systems. Each computer system (102) in the cluster, or a subset thereof, may be provided with the same tag (108) to load the same operating system.

As an alternative to a physical device, the computer system (102) may be a virtual system executing on a physical computing device. For example, the computer system (102) may be a guest domain in a hypervisor environment. In the hypervisor environment, a hypervisor partitions the resources of a physical computing device amongst the guest domains executing on the physical computing device. Each guest domain executes a separate instance of an operating system. Further, the operating system and the applications in the operating system are unaware of the existence of virtualization provided by the hypervisor in accordance with one or more embodiments of the invention.

Continuing with FIG. 1, the computer system (102) includes a device controller (110), a device driver (114), firmware (112), a boot loader (116), and an operating system kernel (118). Each of these components is discussed below.

A device controller (110) is a hardware component that provides a translation between the processor on the computer system (102) and the storage device (100). Specifically, the device controller (110) is an interface between the processor and the storage device (100). Further, the device controller is responsible for transferring data between the storage device(s) (100) connected to the device controller (110) and the computer system (102). In one or more embodiments of the invention, when the computer system (102) is a virtual system, the device controller may be a part of the physical hardware device rather than a part of the computer system (102).

In one or more embodiments of the invention, the device controller (110) is connected to a device driver (114). The device driver (114) is a software program that provides an interface between the operating system and the device controller (110). Specifically, when the operating system wants to retrieve or store data from the storage device (100), the operating system (118) invokes a routine in the device driver (114). In response, the device driver (114) issues commands to the device via the device controller (110). The device controller (110) sends the commands to the device. In one or more embodiments of the invention, the device driver (114) used is dependent on the hardware and the operating system. Further, in one or more embodiments of the invention, the device driver (114) for the storage device (100) is loaded when the operating system is loaded.

Continuing with the computer system (102), the computer system (102) includes firmware (112). Firmware (112) includes a program in a fixed portion of memory that starts when power is provided to the computer system (102). The firmware (112) includes the initial program executed by the processor. For example, the firmware (112) may be a basic input/output system (BIOS), extensible firmware interface (EFI), or other such types of firmware.

In one or more embodiments of the invention, the firmware (112) includes functionality to initiate execution of the boot loader (116). The boot loader (116) may be a part of firmware (112) or a separate device in a fixed location. The boot loader (116) is a small program that includes functionality to obtain the tag (108) for a requested operating system, search one or more storage devices for the boot image (104), and start the execution of the operating system kernel (118) with the tag.

In one or more embodiments of the invention, the boot loader (116) is connected to an operating system kernel (118). The operating system kernel (118) is a protected portion of the operating system that is initiated by the boot loader (116). The operating system kernel (118) includes functionality to receive the tag from the boot loader (116), identify the location of the root file system (106) using the tag, and mount the root file system (106) from the location.

Figure 2A:
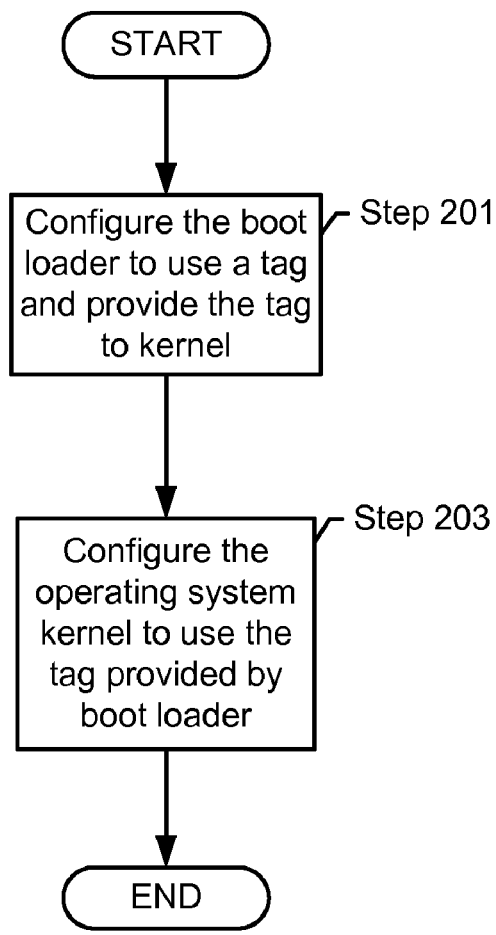
FIGS. 2A-B and 3 show flowcharts in accordance with one or more embodiments of the invention.
Figure 2B:
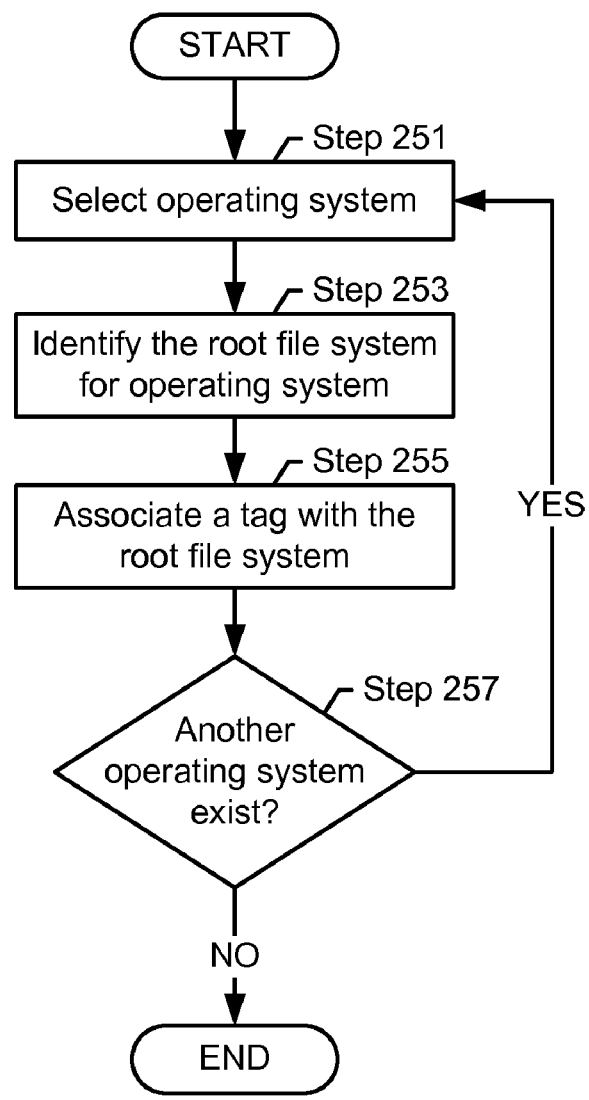
Figure 3:
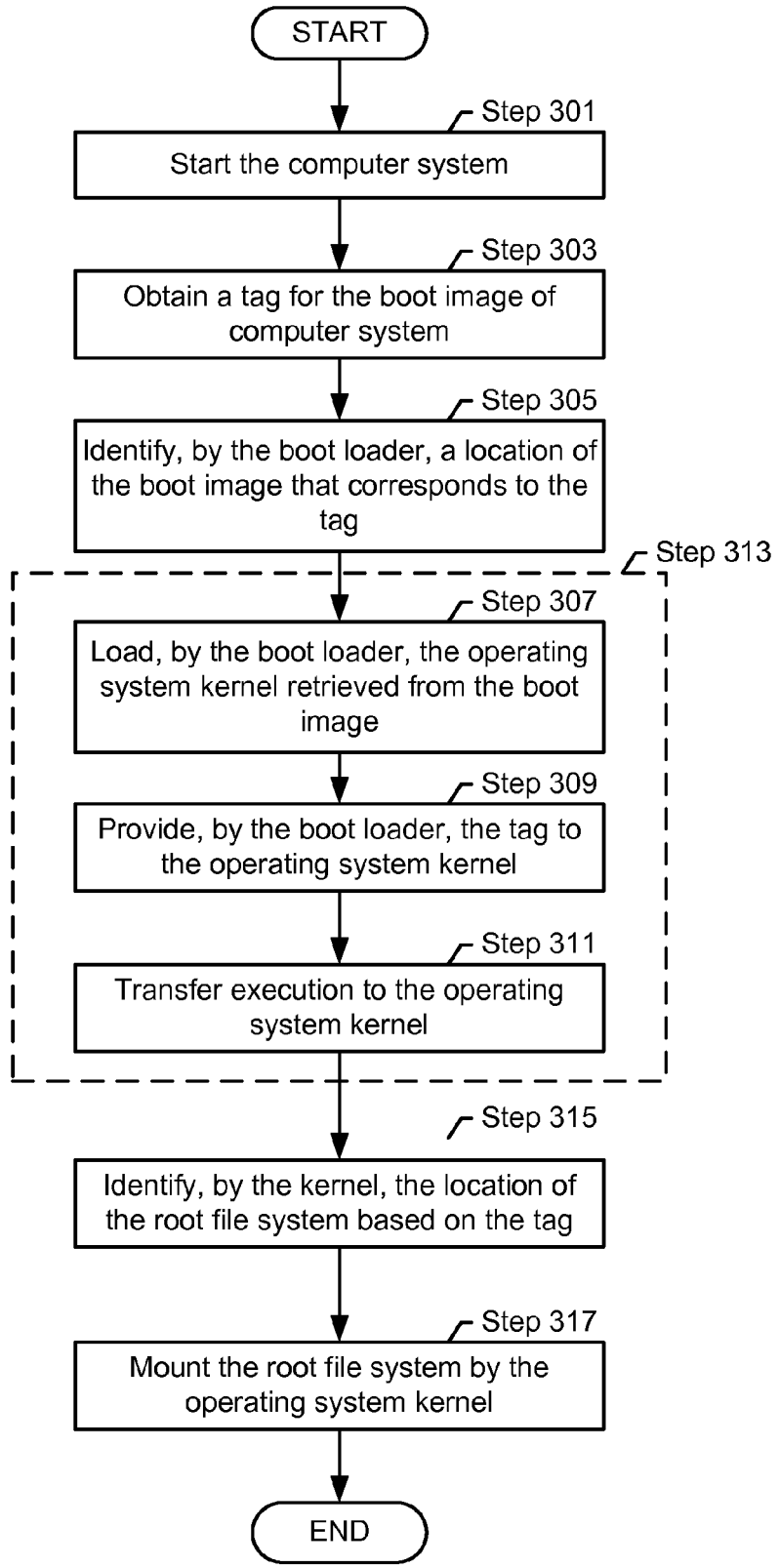

FIGS. 2A-B and 3 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

FIG. 2A shows a flowchart for configuring the boot loader and the operating system in accordance with one or more embodiments of the invention. In one or more embodiments of the invention, the configuration of the boot loader and the operating system is performed by a user.

In Step 201, the boot loader is configured to use the tag and provide the tag to the kernel. Specifically, the boot loader is configured to obtain the tag, use the tag while performing the search, and provide the tag to the operating system kernel. In one or more embodiments of the invention, the configuration is performed in the instructions of the boot loader. For example, instructions may be defined in the boot loader program to use the tag and provide the tag to the operating system while the boot loader is developed. Alternatively, the configuration of the boot loader may be performed in configuration parameters of the boot loader after the boot loader is installed on the computer system. For example, the user interface for setup of the firmware may include an option to select whether the boot loader is to provide the tag or the device name to the operating system. Alternative processes for configuring the boot loader may be performed without departing from the scope of the invention.

In Step 203, the operating system kernel is configured to use the tag provided by the boot loader. The configuring of the operating system kernel may include changing the code of the load routine to receive the tag as the parameter and identify the location of the root file system from the tag. In one or more embodiments of the invention, the operating system kernel is configured based on whether the boot loader is configured to provide the tag. For example, the load routine of the operating system kernel is configured to use the tag in searching for the root file system in accordance with one or more embodiments of the invention. Alternative procedures for configuring the operating system kernel may be performed without departing from the scope of the invention.

While FIG. 2A shows some processes that may be used for configuring the boot loader and operating system, other processes may be performed in accordance with one of more embodiments of the invention. The process used to configure the boot loader may be dependent on the type of tag provided by the boot loader to the operating system kernel and the type of operating system.

FIG. 2B shows a flowchart for assigning tags to the root file system in accordance with one or more embodiments of the invention. In Step 251, the operating system is selected. In Step 253, the root file system for the operating system is identified. In particular, the location of the root file system on a storage device is identified.

In Step 255, a tag is associated with the root file system. In one or more embodiments of the invention, associating the tag with the root file system includes creating a predefined value for the tag for the root file system. Creating the predefined value may be performed using various methods known in the art. One method may include concatenating an identifier for the type of operating system with the version of the operating system and an instance identifier of the operating system. Another method is to set the predefined values as consecutively increasing numbers assigned to the operating system as each operating system is introduced to the system. For example, the first operating system may be assigned the number "1", the next operating system may be assigned the number "2", etc. The above includes only some examples for creating a unique identifier as the pre-defined value, other processes for creating the pre-defined value may be performed without departing from the scope of the invention.

Once the predefined value is created, the predefined value is stored in a pre-specified location of the root file system. In one or more embodiments of the invention, the pre-specified location is consistent across the different operating systems. For example, the pre-specified location may be in the meta-data of each root file system. In the example, each predefined value is stored in the meta-data of the corresponding root file system.

In Step 257, a determination is made whether another operating system exists. If another operating system exists, then the flowchart repeats for the next operating system with Step 251.

FIG. 3 shows a flowchart for booting a computer system in accordance with one or more embodiments of the invention. In Step 301, the computer system is started. In one or more embodiments of the invention, the boot process for the computer system is initiated. For example, power may be provided to the computer system to initiate the boot process. As another example, if the computer system is a guest domain, then the computer system is started when the guest domain is initially created in accordance with one or more embodiments of the invention.

In Step 303, the tag for the boot image for the computer system is obtained. The tag may be provided by a user in the user interface of the firmware setup program. As another example, the boot loader may be configured to query a user while the boot loader is booting the computer system. In the example, the boot loader may display a screen during the booting process that requests that the user select the tag or submit the tag. The screen may optionally include a description of the operating system corresponding to the tag. As another example, the boot loader may be configured to identify the tag based on properties of the tag, such as a file name in which the tag is stored. For example, the boot loader may be configured to search for an operating system based on properties of the tag.

In Step 305, the boot loader identifies a location of the boot image that corresponds to the tag. In one or more embodiments of the invention, the boot loader searches the storage devices for a pre-defined value matching the tag. The manner in which the boot loader searches for the tag may be based on the type of boot loader. When the boot loader finds the tag, the boot loader identifies the location of the boot image as the location having the tag.

In Step 307, the boot loader loads the operating system kernel retrieved from the boot image. Specifically, the boot loader accesses the operating system kernel from the location identified in Step 305. The boot loader loads the operating system kernel from the location into random access memory (RAM). More specifically, at least a subset of the instructions of the operating system kernel is loaded into RAM. In one or more embodiments of the invention, the subset of instructions includes the load routine of the operating system kernel in accordance with one or more embodiments of the invention.

In Step 309, the boot loader provides the tag to the operating system kernel. Because the load routine receives the tag from the boot loader and because only a single location corresponding to the tag exists, the load routine is assured that the operating system and the boot loader will use the same boot image and file system to boot the operating system in accordance with one or more embodiments of the invention.

In Step 311, execution is transferred to the operating system kernel. At this stage, the instructions in the operating system kernel begin executing on the processor. For example, the load routine of the operating system kernel starts executing. In one or more embodiments of the invention, when execution is transferred to the operating system kernel, the boot loader ceases to execute.

As shown in FIG. 3, Steps 307, 309, and 311 may be combined into a single Step 313. For example, the boot loader may perform a function call to the load routine of the operating system kernel. The boot loader may include the tag as an argument of the function call. In such a scenario, the load routine receives the tag as input into the load routine.

Continuing with FIG. 3, in Step 315, the kernel identifies the location of the root file system based on the tag. Specifically, the kernel may search for the root file system having the tag. The kernel may iterate through each storage device to identify the storage device having a root file system matching the tag. The location of the root file system matching the tag is identified. In one or more embodiments of the invention, the kernel identifies the location of the root file system by delegating the actual search with the tag to a routine that is not part of the kernel.

In Step 317, the root file system is mounted by the operating system kernel from the location identified by the operating system kernel. Mounting the root file system allows the root file system to be accessible to the operating system. When the root file system is mounted, the boot process may be deemed complete. Thus, the operating system executes on the processor to start processing tasks.

Although the above methodology is discussed with respect to the loading an operating system, a tag may be used to identify a boot image of a hypervisor for a virtualized computer system in accordance with one or more embodiments of the invention. In one or more embodiments of the invention, the boot image for the hypervisor is similar to the boot image for the operating system. The boot loader may be configured to obtain a tag for the boot image of the hypervisor, identify the location of the boot image, and provide the tag to a load routine of the hypervisor. The tag for the hypervisor may be analogous to the tag defined above for the operating system. The load routine of the hypervisor may include functionality to identify the root file system of the hypervisor using the tag. The root file system for the hypervisor provides the initial file system on which other file systems for the hypervisor may be mounted. The root file system for the hypervisor includes the files for the hypervisor. Accordingly, once the root file system is mounted, the hypervisor may execute on the processor of the computer system.

Further, the hypervisor that is loaded may act as a boot loader to perform the steps discussed above with regards to loading the operating system in accordance with one or more embodiments of the invention. Specifically, the hypervisor may receive a tag for an operating system to load into a guest domain of the computer system. Accordingly, in one or more embodiments of the invention the operating system may be loaded in the guest domain by the hypervisor, as discussed with regards to loading the operating system by the boot loader.

In one or more embodiments of the invention, multiple boot images for different hypervisors may exist on the same computer system. Thus, a user may select both a hypervisor to load on the computer system and one or more operating systems to load in guest domain(s) on the computer system using the tags, in accordance with one or more embodiments of the invention.

Figure 4:
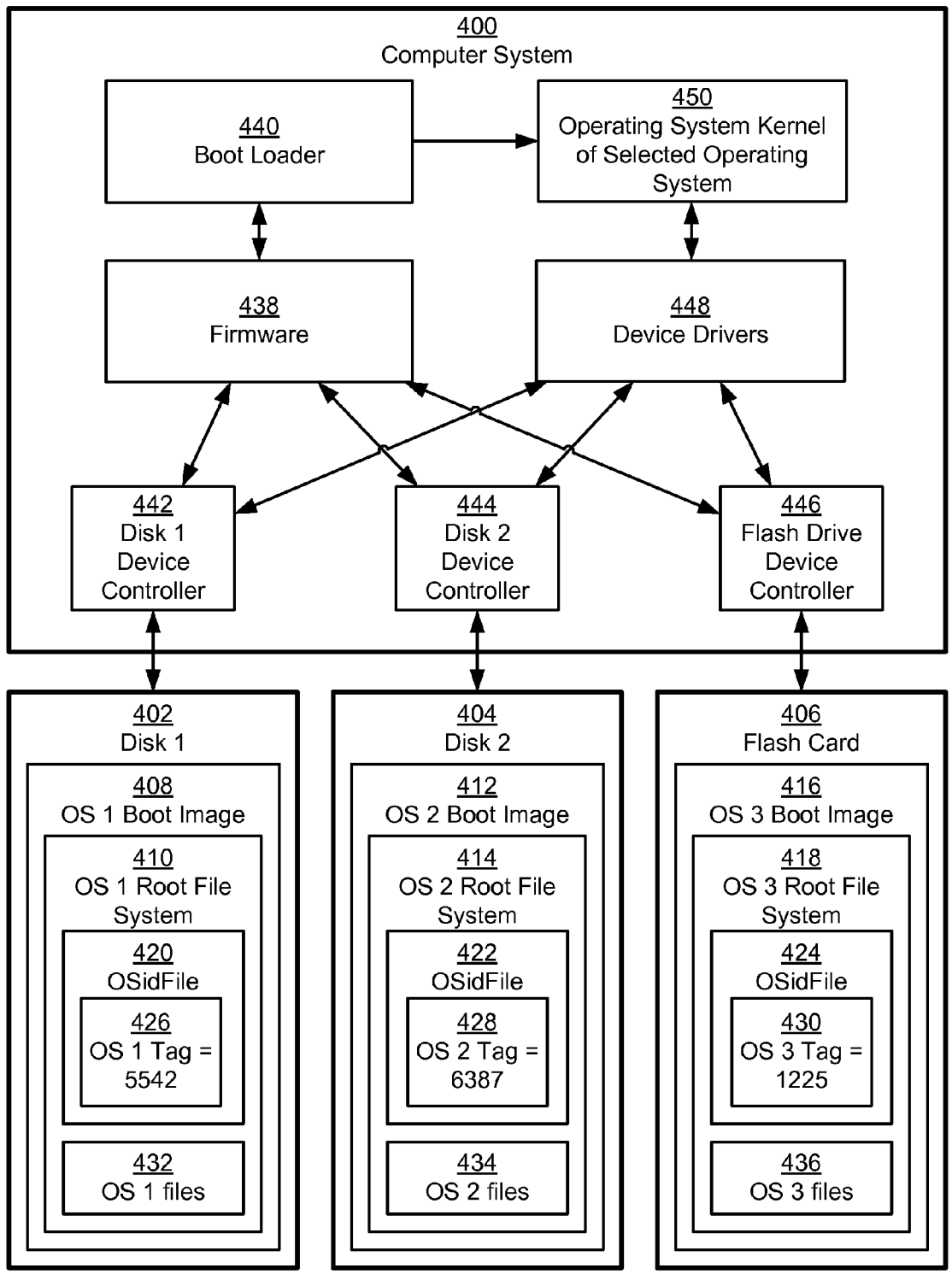
FIGS. 4 and 5 show examples in accordance with one or more embodiments of the invention.
Figure 5:
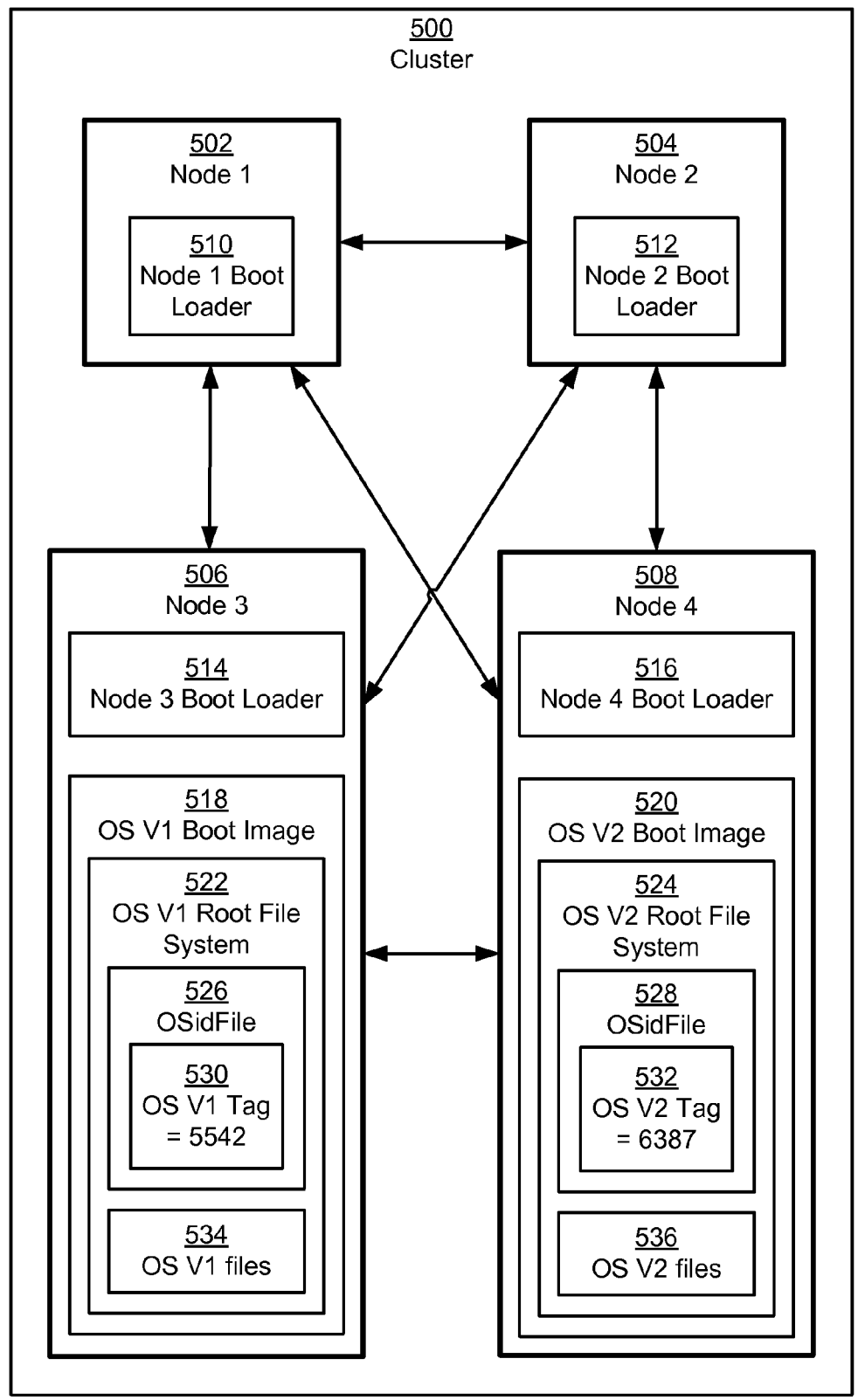

FIGS. 4 and 5 show examples in accordance with one or more embodiments of the invention. The following example is for explanatory purposes only and not intended to limit the scope of the invention.

FIG. 4 shows an example configuration of a single computer system (400) that is connected to multiple storage devices, such as disk 1 (402), disk 2 (404), and a flashcard (406). In the example, each storage device stores an operating system (i.e., OS 1, OS 2, OS 3). Each operating system is a different type of operating system. For example, each operating system may be obtained from a different vender or may be a different version.

Continuing with FIG. 4, disk 1 (402) includes the boot image for operating system 1 (i.e., OS 1 boot image (408)). The OS 1 boot image (408) includes the root file system for the OS 1 (i.e., OS 1 root file system (410)). Disk 2 (404) includes the boot image for operating system 2 (i.e., OS 2 boot image (412)). The OS 2 boot image (412) includes the root file system for the OS 2 (i.e., OS 2 root file system (414)). Similarly, the flashcard (406) includes the boot image for operating system 3 (i.e., OS 3 boot image (416)). The OS 3 boot image (416) includes the root file system for the OS 3 (i.e., OS 3 root file system (418)).

In the example, each root file system (i.e., OS 1 root file system (410), OS 2 root file system (414), OS 3 root file system (418)) stores a file labeled "OSidFile" (i.e., (420), (422), (424)) for storing the predefined value of the tag. As shown in example FIG. 4, OS 1 has a tag with a predefined value of 5542 (426), OS 2 has a tag with a predefined value of 6387 (428), OS 3 has a tag with a predefined value of 1225 (430). In the example, the tag may be a filename, a superblock field, in file data, or in another portion of the root file system.

Each root file system (i.e., OS 1 root file system (410), OS 2 root file system (414), OS 3 root file system (418)) also stores the files for the corresponding operating system (i.e., OS 1 files (432), OS 2 files (434), OS 3 files (436)). The files for the operating system include the executable files for executing the kernel of each operating system.

The following is an example of a boot process of the example computer system (400) shown in FIG. 4. Initially, the user turns on the computer system (400). For example, the user may select the physical power switch on the computer system. The processor (not shown) on the computer system begins executing instructions. The first instructions that the processor executes are the instructions in the firmware (438) stored in a fixed location of ROM. The execution of the instructions of the firmware (438) loads the boot loader (440) from a fixed location of storage and starts execution of the boot loader (440).

At this stage, in the example, the boot loader (440) starts searching for the operating system to load. Accordingly, in the example, the boot loader (440) may display a request for a tag on the monitor of the computer system (400). The user wants to load OS 3. Accordingly, after reviewing the request, the user submits the value of the tag corresponding to the OS 3, "1225".

After obtaining the tag from the user, the boot loader (440) starts searching the storage devices. The boot loader may access the storage devices via the firmware (438) and the device controllers (i.e., disk 1 device controller (442), disk 2 device controller (444), flash drive device controller (446)). For example, the boot loader may start with disk 1 (402). The boot loader accesses the OSidFile (420) on disk 1 (402) to obtain the value of "5542". Because "5542" does not match "1225", the boot loader (440) repeats the process with disk 2 (404). After not finding a match, the boot loader (440) checks the flash card (406). In the flask card, the boot loader finds that OSidFile (424) contains the tag with the predefined value of "1225". Because OS 3 tag has a predefined value of "1225" that matches the value submitted by the user, the boot loader (440) identifies the flash card (406) as the location of the OS 3 boot image (416).

Accordingly, the boot loader loads the operating system kernel for the selected operating system (450) from the OS 3 files (436) into RAM. In the example, the boot loader (440) issues a call to the load routine of OS 3 kernel (450) and provides the tag as the argument of the call. At this stage, the boot loader (440) transfers execution to the OS 3 kernel (450). The OS 3 kernel (450) uses the tag to identify the location of the root file system having a predefined value matching the tag. Specifically, the OS 3 kernel (450) may search disk 1 (402), disk 2 (404), and the flash card (406) through the device drivers (448) and the device controllers (i.e., disk 1 device controller (442), disk 2 device controller (444), flash drive device controller (446)). Specifically, for each storage device, the OS 3 kernel looks for a file named "OSidFile" (i.e., (426), (428), (430)). After finding the file, the OS 3 kernel (450) accesses the "OSidFile" to obtain the predefined value of the tag from the file. While searching the flash card (406), the OS 3 kernel (450) access the "OSidFile" to find that the flash card (406) has the pre-defined value of the tag (430) matching the value provided by the boot loader (440). Accordingly, the OS 3 kernel (450) mounts the OS 3 root file system (418) from the flash card (406). Thus, OS 3 executes on the processor of the computer system (400) using the mounted root file system. Because the boot loader provided the tag to the OS 3 kernel, both the boot loader and the OS 3 kernel are assured of accessing the same storage device to find the same files for the operating system.

FIG. 5 shows another example in accordance with one or more embodiments of the invention. FIG. 5 shows an example in which the computer system is a node in the cluster (500) containing multiple computer systems. For the purposes of the example, only four nodes (i.e., node 1 (502), node 2 (504), node 3 (506), node 4 (508)) are shown, however the cluster may contain hundreds of nodes without departing from the scope of the invention. For the example, consider the scenario in which an administrator wants to ensure that all nodes (i.e., node 1 (502), node 2 (504), node 3 (506), node 4 (508)) in the cluster (500) execute version 2 of the operating system (i.e., OS V2) rather than version 1 of the operating system (i.e., OS V1).

In the example shown FIG. 5, OS V1 is stored on node 3 (506). Specifically, the OS V1 boot image (518) containing the OS V1 root file system (522) is stored on node 3 (506). The OS V1 root file system (522) includes an OSidFile (526) having a tag with a predefined value of 5542 (530) and OS V1 files (534). The OS V2 is stored on node 4 (508). Specifically, the OS V2 boot image (520) containing the OS V2 root file system (524) is stored on node 4 (508). The OS V2 root file system (524) includes an OSidFile (528) having a tag with a predefined value of 6387 (532) and OS V2 files (536).

Because the administrator wants to execute OS V2 on each node in the cluster (500), the administrator provides power to each node and submits the OS V2 tag value of "6387" to each node's boot loader (i.e., node 1 boot loader (510), node 2 boot loader (512), node 3 boot loader (514), node 4 boot loader (516)). Each node's boot loader (i.e., node 1 boot loader (510), node 2 boot loader (512), node 3 boot loader (514), node 4 boot loader (516)) searches local and remote storage for the boot image associated with the tag having a predefined value of "6387". Because only a single version of the operating system stored in the cluster (500) is associated with the value, the administrator is assured that if each boot loader finds the operating system version, it is the correct version. Further, because the boot loader provides the tag to the OS V2 kernel, the administrator is further assured that the correct root file system (i.e., the OS V2 root file system (524)) is mounted on each node in the cluster (500).

As another example, consider a scenario in which multiple nodes exist, and each node has separate storage (e.g., separate disks). Within the storage of each node is a copy of an operating system. The copy of the operating system may be stored on different storage devices for each node. For example, some of the nodes may have the copy stored on disk 1 while other nodes have the copy stored on disk 3. The copy of the operating system has the same tag for each node in the example. Accordingly, a user may provide a tag identifier to each node. In response to the tag, each node identifies and loads the same operating system in the example. Thus, as shown by way of example, even though the location of the operating system is different for each node, the user is assured that each node loads the same operating system in accordance with one or more embodiments of the invention.

Figure 6:
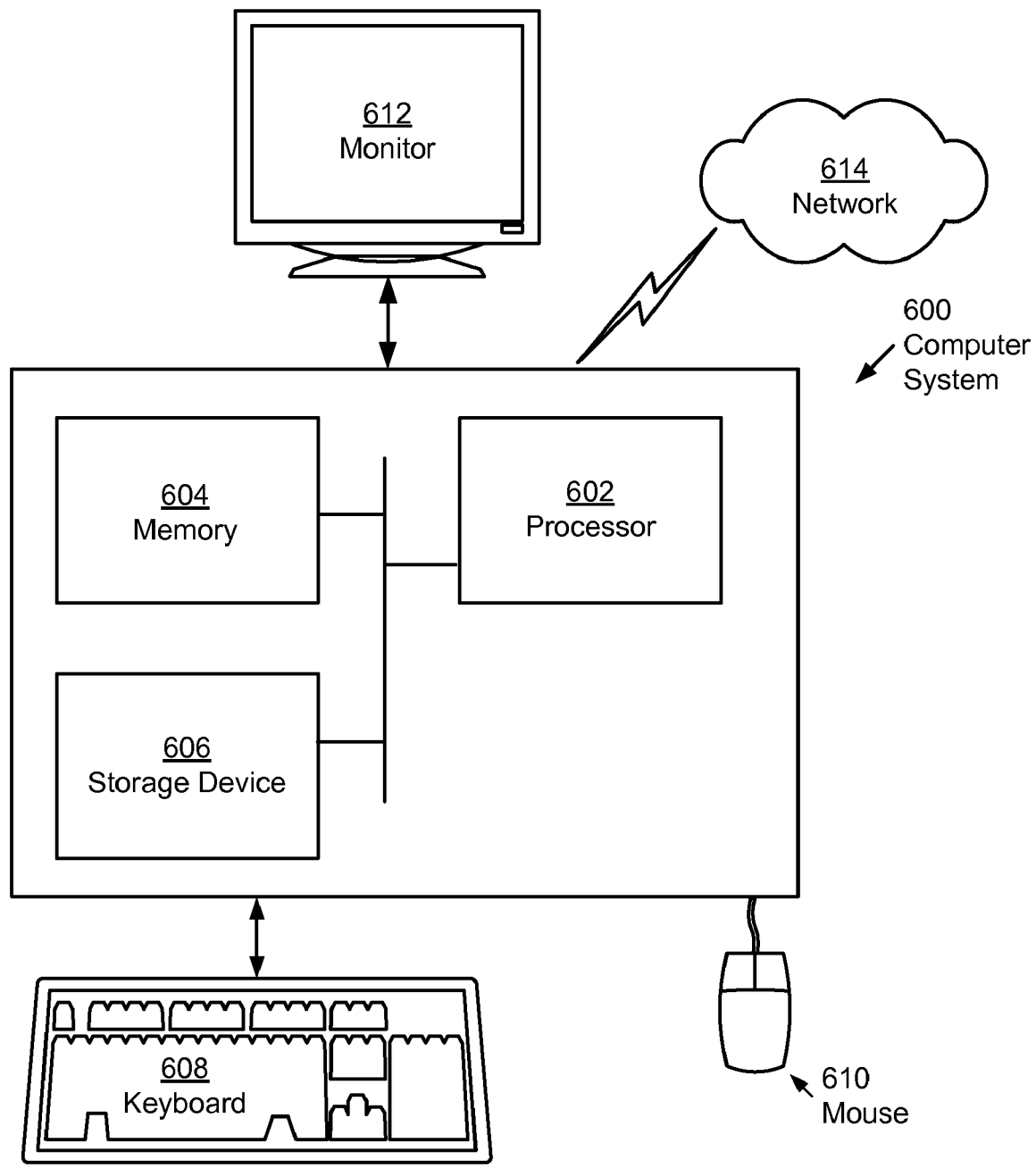
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., boot loader, root file system, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a unified method for the boot loader and the operating system kernel to find the operating system files. Thus, the boot loader and the operating system kernel are assured that they will boot from the same source. Further, the tag may be used to assure that in a virtualized system having multiple guest domains, each guest domain boots from the same source. Similarly, the tag may be used to assure that each node in a cluster or federated system boot from the same machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for discovery of a root file system, comprising:
    obtaining a tag corresponding to a boot image for an operating system;
    identifying, by a boot loader, a location of the boot image having a predefined value matching the tag;
    loading a kernel of the operating system retrieved from the boot image;
    transferring execution to the kernel, wherein the boot loader provides the tag for the location to the kernel;
    identifying, by the kernel, the location of the root file system based on the tag provided by the boot loader; and
    executing the operating system on a processor using the root file system identified by the kernel.

2. The method of claim 1, wherein the boot loader is comprised in a hypervisor, and wherein the operating system is loaded in a guest domain by the hypervisor.

3. The method of claim 1, wherein the boot loader executes on a node in a cluster, and wherein the location is a remote location on a separate node in the cluster.

4. The method of claim 3, wherein each node in the cluster identifies the location using the tag.

5. The method of claim 1, wherein the predefined value is comprised in at least one selected from a group consisting of a file system unique identifier, a file in the root file system, and a file system label.

6. The method of claim 1, wherein the location is on a storage device, and wherein the storage device comprises a separate boot image for each of a plurality of operating systems.

7. A computer system for discovery of a root file system, comprising:
    a processor;
    a boot loader executing on the processor and configured to:
        obtain a tag corresponding to a boot image for an operating system;
        identify a location of the boot image having a predefined value matching the tag;
        load a kernel of the operating system retrieved from the boot image; and
        transfer execution to the kernel, wherein the boot loader provides the tag to the kernel; and
    the kernel executing on the processor and configured to:
        identify the location of the root file system based on the tag provided by the boot loader,
    wherein the operating system is executed on the processor using the root file system identified by the kernel.

8. The computer system of claim 7, further comprising:
    a hypervisor comprising the boot loader; and
    a guest domain, wherein the operating system is loaded in the guest domain by the hypervisor.

9. The computer system of claim 7, wherein the computer system is a node in a cluster, and wherein the location is a remote location on a separate node in the cluster.

10. The computer system of claim 9, wherein each node in the cluster identifies the location using the tag.

11. The computer system of claim 7, further comprising:
    a storage device comprising separate boot images for each of a plurality of operating systems, wherein the location is on the storage device.

12. The computer system of claim 7, wherein the predefined value is comprised in at least one selected from a group consisting of a file system unique identifier, a file in the root file system, and a file system label.

13. A distributed computer system comprising a plurality of nodes wherein each of the plurality of nodes is configured to:
- obtain a tag corresponding to a boot image for an operating system;
- identify, by a boot loader executing on each node of the plurality of nodes, a location of the boot image having a predefined value matching the tag;
- load a kernel of the operating system retrieved from the boot image on each node of the plurality of nodes;
- transfer execution to the kernel on each node of the plurality of nodes, wherein the boot loader provides the tag to the kernel;
- identify, by the kernel on each node of the plurality of nodes, the location of the root file system based on the tag provided by the boot loader; and
- execute the operating system on a processor on each node of the plurality of nodes using the root file system identified by the kernel.

14. The distributed computer system of claim 13, wherein the location is the same location for each of the plurality of nodes.

15. The distributed computer system of claim 13, wherein the location is on local storage of each of the plurality of nodes.

16. The distributed computer system of claim 13, wherein the predefined value is comprised in at least one selected from a group consisting of a file system unique identifier, a file in the root file system, and a file system label.

17. The distributed computer system of claim 13, wherein the location is on a storage device, and wherein the storage device comprises a separate boot image for each of a plurality of operating systems.

18. A method for discovery of a root file system of a hypervisor, comprising:
- obtaining a first tag corresponding to a boot image for the hypervisor;
- identifying, by a boot loader, a first location of the boot image for the hypervisor having a predefined value matching the first tag;
- loading a load routine for the hypervisor retrieved from the boot image for the hypervisor;
- transferring execution to the load routine, wherein the boot loader provides the first tag to the load routine;
- identifying, by the load routine, the first location of the root file system of the hypervisor based on the first tag provided by the boot loader; and
- executing the hypervisor on a processor using the root file system of the hypervisor identified by the hypervisor.

19. The method of claim 18, further comprising:
- obtaining, by the hypervisor, a second tag corresponding to a boot image for an operating system;
- identifying, by the hypervisor, a second location of the boot image for the operating system having a predefined value matching the second tag;
- loading a kernel of the operating system retrieved from the boot image for the operating system;
- transferring execution to the kernel, wherein the boot loader provides a second tag to the kernel;
- identifying, by the kernel, the second location of the root file system based on the second tag provided by the hypervisor; and
- executing the operating system on the processor using the root file system of the operating system identified by the kernel.

20. The method of claim 18, wherein the predefined value matching the first tag is comprised in at least one selected from a group consisting of a file system unique identifier, a file in the root file system, and a file system label.

* * * * *